United States Patent [19]

Feldkamp et al.

[11] Patent Number: 5,531,108
[45] Date of Patent: Jul. 2, 1996

[54] ADAPTIVE CORRECTION OF TORSIONAL AND WHEEL PROFILE POSITION IRREGULARITIES FOR MISFIRE DETECTION

[75] Inventors: Lee A. Feldkamp, Plymouth; Gintaras V. Puskorius, Redford; John V. James, Walled Lake; Kenneth A. Marko, Ann Arbor, all of Mich.

[73] Assignee: Ford Motor Company, Dearborn, Mich.

[21] Appl. No.: 417,357

[22] Filed: Apr. 5, 1995

[51] Int. Cl.⁶ ............................................. G01M 15/00
[52] U.S. Cl. ................................. 73/117.3; 364/431.07
[58] Field of Search .............................. 73/116, 117.3; 123/419, 436; 364/431.07

[56] References Cited

U.S. PATENT DOCUMENTS

| | | |
|---|---|---|
| 4,843,870 | 7/1989 | Citron et al. . |
| 5,041,979 | 8/1991 | Hirka et al. ................. 73/116 |
| 5,044,194 | 9/1991 | James et al. . |
| 5,056,360 | 10/1991 | Dosdall et al. . |
| 5,079,945 | 1/1992 | Hansen et al. ................. 73/116 |
| 5,088,318 | 2/1992 | Osawa .................. 73/117.3 |
| 5,095,742 | 3/1992 | James et al. . |
| 5,109,695 | 5/1992 | James et al. . |
| 5,117,681 | 6/1992 | Dosdall et al. . |
| 5,200,899 | 4/1993 | Ribbens et al. . |
| 5,237,862 | 8/1993 | Mangrulkar et al. . |
| 5,263,453 | 11/1993 | Wakahara et al. .............. 73/117.3 |
| 5,275,037 | 1/1994 | Nakayama et al. ............. 73/117.3 |
| 5,287,282 | 2/1994 | Imai . |
| 5,297,047 | 3/1994 | Matsuno . |
| 5,307,671 | 5/1994 | Akase ................... 73/117.3 |
| 5,331,848 | 7/1994 | Nakagawa et al. ............ 73/116 |
| 5,361,629 | 11/1994 | McCombie .................. 73/117.3 |
| 5,377,112 | 12/1994 | Brown, Jr. et al. ............ 73/117.3 |
| 5,377,537 | 1/1995 | James . |
| 5,394,742 | 3/1995 | Angermeier et al. .......... 73/117.3 |
| 5,415,035 | 5/1995 | Shimasaki et al. ............. 73/117.3 |

Primary Examiner—Richard Chilcot
Assistant Examiner—Eric S. McCall
Attorney, Agent, or Firm—Mark Mollon; Roger L. May

[57] ABSTRACT

A crankshaft based misfire detector for an internal combustion engine detects and identifies misfire over a broad range of engine operating conditions by establishing correction factors to compensate for crankshaft torsional oscillations and static wheel profile errors which corrupt the acceleration signals used to detect misfire. The correction factors are adaptively determined during in-use engine operation and are updated in one manner for most firings but in another manner for any cylinder firing which had the relatively lowest corrected acceleration within an engine cycle.

11 Claims, 5 Drawing Sheets

ADAPTIVE CORRECTION OF TORSIONAL AND WHEEL PROFILE POSITION IRREGULARITIES FOR MISFIRE DETECTION

BACKGROUND OF THE INVENTION

The present invention relates in general to misfire detection in internal combustion engines, and more specifically to a system and method that corrects for irregularities in measured crankshaft velocities resulting from torsional flexing of the crankshaft and errors in the placement of position markers in a crankshaft position sensor.

In crankshaft based misfire detection methods, the failure of one or more cylinders to produce power during its respective power stroke is detected by sensing very small changes in the velocity (and thus acceleration) of the engine crankshaft. Since the velocity during each velocity measuring interval of engine rotation is determined according to the rotational arc $\Delta\theta$ covered by the interval divided by the time $\Delta T$ required to pass through the arc, the measured values for both $\Delta\theta$ and $\Delta T$ must be measured sufficiently accurately to provide the sensitivity required to detect such small velocity changes.

Crankshaft based misfire detection methods are discussed in U.S. Pat. Nos. 5,044,194, 5,056,360, and 5,109,695, all hereby incorporated by reference. Such methods perform well under certain engine operating conditions. However, at certain combinations of engine speed and engine load, the accuracy of crankshaft based misfire detection methods typically decreases. For example, with an engine operating at high speed and low load, irregularities in the measured crankshaft velocity interfere with reliable detection of misfires or proper firings of individual cylinders.

A significant source of such irregularity is position errors in determining the rotational arcs during each measuring interval. Engine rotational position is monitored using a rotor having vanes, teeth, or slots disposed thereon for interacting with magnetic or optical sensors at predetermined points in the rotation of the engine crankshaft. One source of position error results from the rotor wheel profile. During manufacture of a wheel, errors occur between the desired and actual positions for position markers on the wheel. Any deviation of the actual angle $\Delta\theta$ from the assumed value results in velocity and acceleration errors. This type of position error is discussed in U.S. Pat. No. 5,117,681, which is incorporated herein by reference. Another source of irregularity is the torsional flexing of the crankshaft during engine operation. The crankshaft is an extended shaft constructed of metal which is not completely rigid and thus flexes as it is driven by the engine cylinder firings. A crankshaft typically is connected to a flywheel of large mass near the back of an engine and extends through the front of the engine for access by auxiliary components. The torsional flexing along the crankshaft creates oscillations in the sensed crankshaft rotation intervals. These oscillations again lead to irregularities in the resulting velocities and accelerations, possibly causing inaccuracies in the misfire detection.

Corrections are known for each source of velocity irregularity. U.S. Pat. No. 5,117,681 discloses a method for measuring wheel profile errors in an individual engine and storing correction factors used during misfire detection to remove the position errors. U.S. Pat. No. 5,237,862, incorporated herein by reference, discloses an adaptive method for correcting for wheel profile errors that derives the correction factors during actual engine operation. The misfire detector attempts to identify periods when no misfire occurs and then smooth out the variations in cylinder accelerations to remove the fluctuations caused by the wheel profile errors.

Reduction of the effects of crankshaft torsional disturbances using torsional correction factors derived at various engine speeds and loads has been demonstrated in U.S. Pat. No. 5,377,537. Thus, it is known that the torsional oscillation includes a periodic component that is substantially constant at each separate constant speed and load point of the engine. By measuring the torsional oscillations in a test engine, correction factors are determined and stored in a look-up table to be used in production engines for misfire detection during normal vehicle use. Although a test engine characterizes the expected torsional oscillations for a particular engine design reasonably well, engines of that same design may experience changes in torsional flexing as the engines wear with use. Furthermore, in some circumstances it may be desirable to eliminate the need for measuring test engines and storing look-up tables associated with each different engine design and the resulting manufacturing complexities.

Adaptive correction methods in misfire detectors must overcome several difficulties. The basis of adaptation is that the correction factors can be derived during a time when misfire is not present. Thus any adaptive learning of correction factors must be disabled under conditions of misfire. However, detection of a misfire depends upon the capability of the correction which itself depends upon the ability to detect a misfire, leading to a circular problem that adaptation cannot be achieved until adaptation is achieved. In addition, if updating of the learned correction factor is cut off during conditions of misfire and if engine conditions are changing during that same period, the latest available correction factors may become inaccurate. Furthermore, it is possible that the adaptive correction may adapt to a gradual onset of power loss in a cylinder and thus become incapable of detecting an actual power loss that has reached the required threshold.

SUMMARY OF THE INVENTION

The present invention generates correction factors which when subtracted from measured acceleration values produce corrected acceleration values that more closely represent the ideal acceleration values without influence from wheel profile errors and torsional oscillations. Among the numerous advantages of the corrected acceleration values are improved accuracy of misfire detection, increased coverage of the speed-load map of an engine, and computationally simple implementation without extensive memory or processing requirements. Correction factors are obtained adaptively without the need for a look-up table or stored correction factors from previous trips. The method of deriving correction factors does not depend on the actual detection of misfires during the adaptation. Nevertheless, the invention avoids learning a misfire condition as a normal condition.

More specifically, the invention comprises a method of obtaining adaptive correction factors to determine crankshaft acceleration in a misfire detector for an internal combustion engine with N cylinders. A plurality of raw acceleration values is measured. The raw acceleration values are corrected to produce corrected acceleration values in response to a plurality (N) of respective adaptive correction factors. One of the adaptive correction factors is selected for updating. A block of N consecutive corrected acceleration values is selected including a particular corrected acceleration value corresponding to a particular engine cylinder and therefore to the selected adaptive correction factor. The corrected acceleration value is compared with the others in the block and if the particular corrected acceleration value is less than each of the other corrected acceleration values of the block, then the particular adaptive correction factor is updated in a first manner without regard to the raw acceleration value corresponding to that particular corrected acceleration value. Otherwise, if the particular corrected acceleration value is not less than each of the other corrected acceleration values in the block, then the particular adaptive correction factor is updated in a second manner responsive to the raw acceleration value corresponding to the particular corrected acceleration value.

DETAILED DESCRIPTION OF PREFERRED EMBODIMENTS

Figure 1:
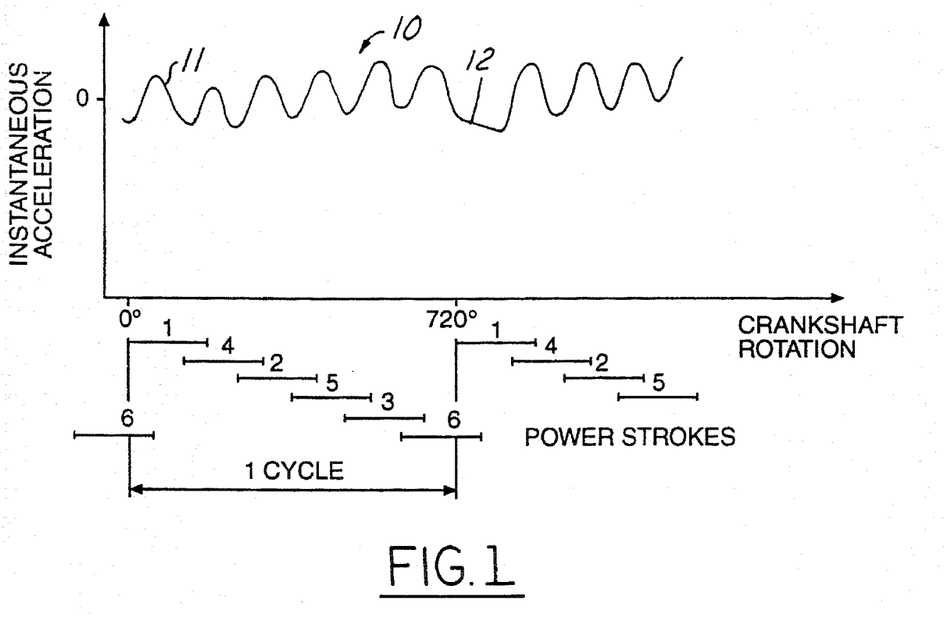
FIG. 1 is a plot showing instantaneous acceleration versus crankshaft rotation for normal and misfiring cylinders.

In the typical 4-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
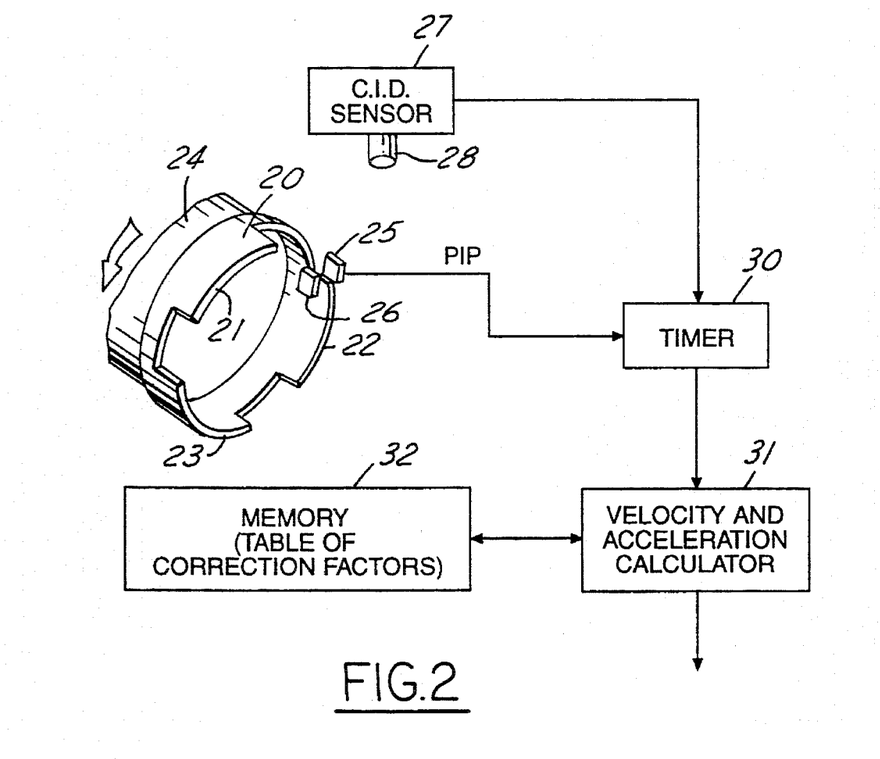
FIG. 2 is a schematic and block diagram showing measuring and calculating apparatus according to the present invention.

As described in the patents mentioned above, crankshaft based misfire detectors have advantageously employed measured rotation intervals occurring at a frequency of about once per cylinder firing rather than attempting to measure instantaneous values as shown in FIG. 1. FIG. 2 shows an apparatus for measuring velocity and obtaining corrected acceleration values according to the present invention. An engine rotation position sensing system includes a rotor 20 including vanes 21, 22, and 23 which rotate with a crankshaft 24 (a 3-vane rotor from a 6-cylinder engine is shown in this example). Vanes 21–23 pass between a hall-effect sensor 25 and a permanent magnet 26 to generate a profile ignition pulse (PIP) signal as crankshaft 24 rotates. Vanes 21–23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 27 is connected to a camshaft 28 for identifying which of the two cylinders is actually on its power stroke. Camshaft 28 rotates once for every two rotations of crankshaft 24. The resulting CID signal is preferably generated having a rising edge corresponding to the power stroke of cylinder No. 1. A timer 30 receives the PIP signal and the CID signal and measures elapsed time between predetermined engine position locations as determined by the PIP and CID signals. The elapsed time $\Delta T_i$ for each velocity measuring interval i is output from timer 30 to a velocity and acceleration calculator 31.

In a preferred embodiment, timer 30 and velocity and acceleration calculator 31 are implemented as part of a micro-controller with an associated memory 32 for storing correction factors, other data, and software instructions.

Figure 3:
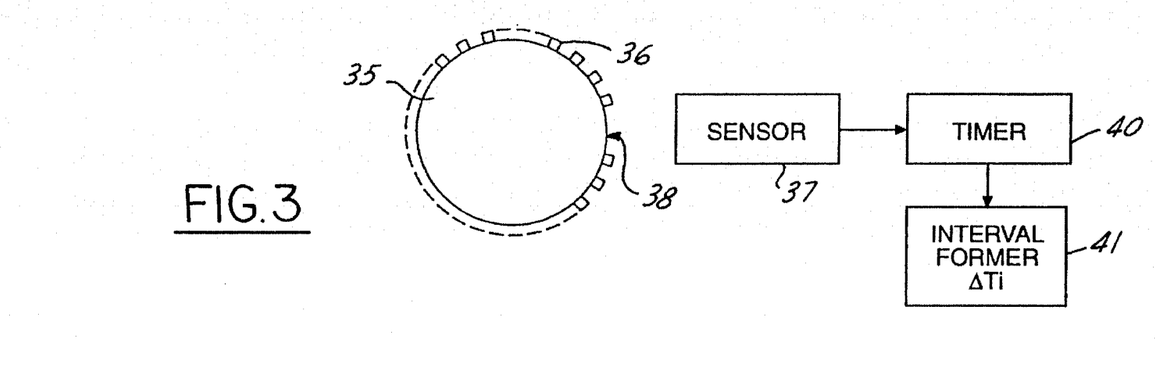
FIG. 3 shows an alternative embodiment for measuring apparatus.

An alternative embodiment of position sensing apparatus is shown in FIG. 3. A multi-toothed wheel 35 is mounted on an engine for rotation with the crankshaft. A plurality of teeth 36 are disposed along the periphery of wheel 35 at a predetermined angular spacing. Teeth 36 are preferably comprised of a metal or other magnetically permeable material. A variable reluctance sensor 37 is disposed in a fixed location closely spaced to teeth 36 for sensing the passage of teeth past sensor 37. A missing tooth location 38 is provided on wheel 35 to establish an absolute location reference, e.g. at 90° before top dead center of cylinder No. 1. A CID signal (not shown) would also be utilized to differentiate between the two halves of the engine cycle. CID sensors other than a camshaft sensor could alternatively be utilized to resolve the ambiguity between the power stroke and the intake stroke, such as sensors responsive to ignition coil current or voltage.

Sensor 37 is connected to a timer 40 and interval former 41 to produce rotation intervals $\Delta T_i$.

Figure 4:
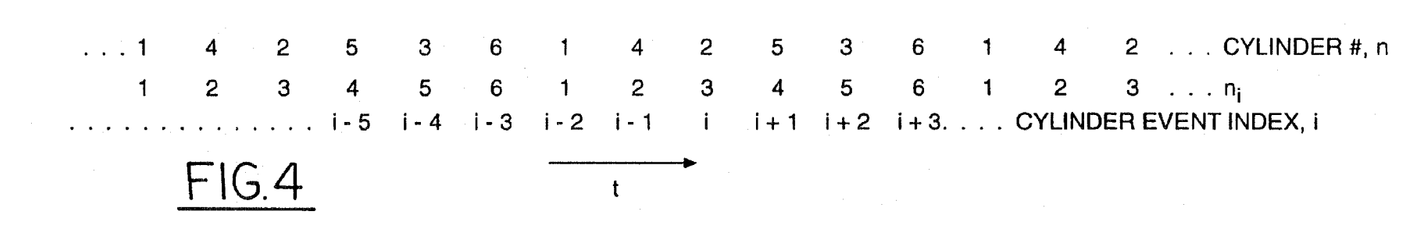
FIG. 4 illustrates consecutive power strokes or firing intervals of a six-cylinder engine and the corresponding notation to denote cylinder events.

As shown in FIG. 4, for an engine having N cylinders, each individual cylinder n occurs in the particular firing order of the engine. A six cylinder engine is shown wherein the firing order is comprised of cylinder Nos. 1, 4, 2, 5, 3, and 6. A cylinder event index i is used to designate each individual cylinder's acceleration, and a misfire call determined for each individual cylinder firing. For any particular value of index i, a corresponding cylinder $n_i$ and a corresponding correction factor $COR(n_i)$ are identified. For purposes of implementation, it is convenient to number cylinders by their position in the engine firing sequence, rather than by cylinder number designation. Thus, $n_i$ is an index for referring to the individual cylinders in order of firing sequence at discrete time index i, as is shown in FIG. 4.

Figure 5A:
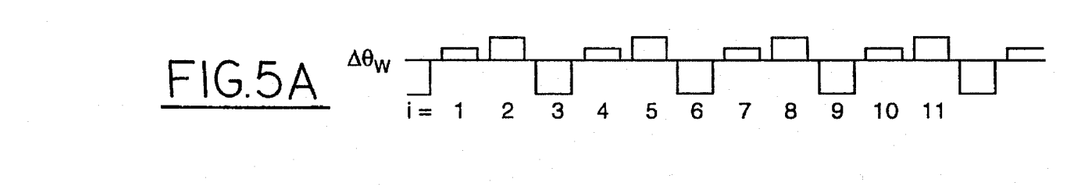
FIG. 5A plots an example of wheel profile errors which introduce irregularity into the crankshaft position signal.
Figure 5B:
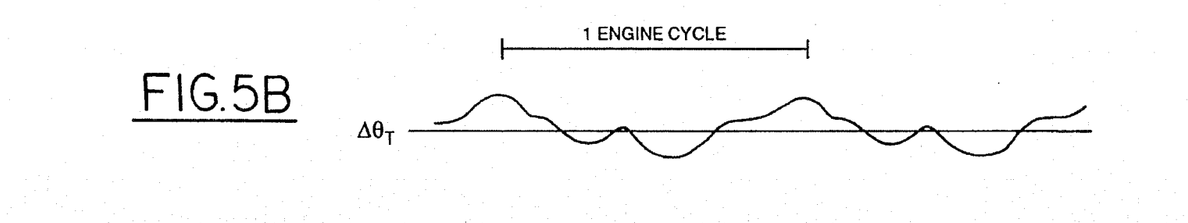
FIG. 5B shows a quasi-periodic torsional crankshaft oscillation signal introducing irregularity into the position signal.

Inaccuracies in the spacing of vanes as shown in FIG. 2 or teeth in FIG. 3 result in position errors $\Delta\theta_w$ as shown in FIG. 5A. For each cylinder event i, an angular offset $\Delta\theta_w$ is shown that is the difference between the actual angular spacing and the assumed angular spacing from the rotor design. Data for a hypothetical six-cylinder engine is shown in FIG. 5A. Thus, the pattern of data repeats substantially identically after every three cylinder events and the offsets over three consecutive cylinder events sum to zero since any offsets are cancelled out after one full crankshaft rotation (i.e. there is no residual error in measuring 360°). FIG. 5B shows an angular offset $\Delta\theta_T$ resulting from torsional oscillations of the crankshaft. This quasi-periodic torsional error repeats with a period about equal to one engine cycle and is substantially constant at each respective speed and load point in the operating area of an engine. However, as speed and load change, the quasi-periodic torsional error dynamically changes. Furthermore, the waveform at any particular speed and load point may change over the life of an engine. Therefore, an adaptive method of compensating for the errors shown in FIGS. 5A and 5B is desired.

Figure 6:
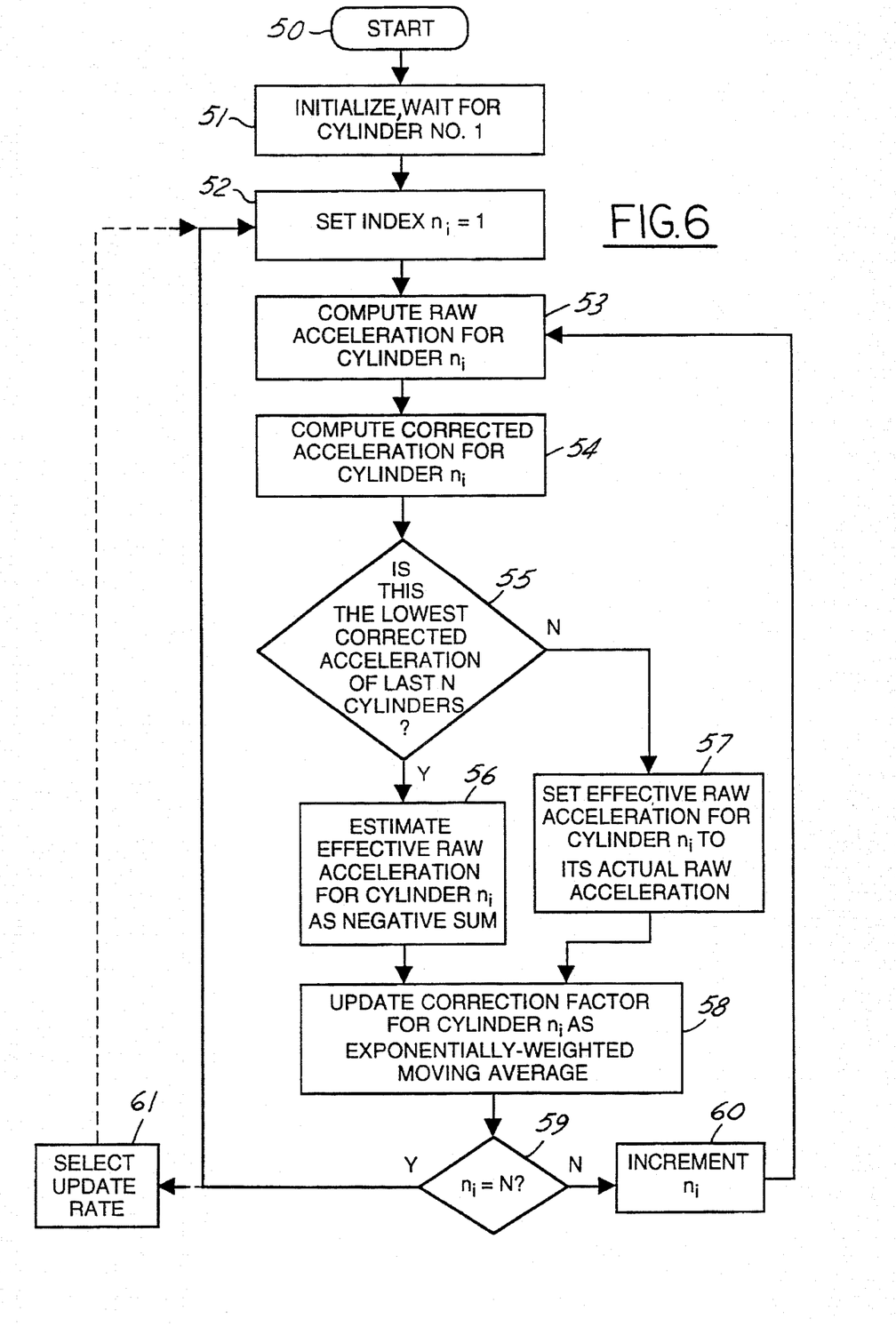
FIG. 6 shows a flowchart according to the method of the present invention for providing adaptive correction factors.

A preferred embodiment of a method according to the present invention begins at step 50 in FIG. 6. In step 51, the initialization of the implementation includes obtaining a block of N consecutive measurements of the raw accelerations (N refers to the total number of cylinders of an engine). In addition, the N correction factors are assigned initial values, e.g., all to zero or perhaps to some other values in the event that data concerning wheel profile errors is available. After initialization, the operation is synchronized by waiting for the first cylinder in the firing sequence (e.g., cylinder no. 1). In step 52, index $n_i$ is set to one.

In step 53, the raw acceleration for cylinder $n_i$ is determined using two consecutive measured PIP intervals. In step 54, the raw acceleration value is corrected to produce a corrected acceleration value through the use of an adaptive correction factor, as is described below. Each of the N cylinders has a corresponding adaptive correction factor.

After correcting the particular raw acceleration value, the corresponding adaptive correction factor is considered for updating. In step 55, the corrected acceleration value for cylinder $n_i$ is compared to the previous N-1 corrected acceleration values (corresponding to indexes $n_{i-N+1}$, $n_{i-N+2}$, ... $n_{i-1}$).

If the particular corrected acceleration value for cylinder $n_i$ under consideration is found to be less than each of the previous N-1 corrected acceleration values, then an estimated raw acceleration value for cylinder $n_i$ is derived in step 56. The estimated raw acceleration value becomes an effective acceleration value to be used in step 58 to update the selected correction factor for cylinder $n_i$. The estimate may be based on the preceding N-1 raw acceleration values corresponding to the other N-1 cylinders, but does not rely on the particular corrected acceleration value for cylinder $n_i$ because it may correspond to a misfire. If, on the other hand, the particular corrected acceleration value for cylinder $n_i$ is not lower than each of the preceding N-1 corrected acceleration values, then the effective raw acceleration value for cylinder $n_i$ is taken to be its measured raw acceleration value in step 57. The correction factor for cylinder $n_i$ is updated in step 58 using the cylinder's effective raw acceleration value from either step 56 or 57.

A check is made in step 59 to determine whether the entire set of N correction factors have been updated since step 52 was last visited. If not, then cylinder index $n_i$ is incremented by one in step 60 and a return is made to step 53 to process the next cylinder's measurements. If it is determined in step 59 that all correction factors have been updated (i.e., $n_i=N$), then a return is made to step 52 where the index $n_i$ is reset to one to correspond to the first cylinder in the firing sequence (an optional step 61 will be discussed in connection with FIG. 7 below).

In an alternative to the embodiment shown in FIG. 6, rather than estimating a raw acceleration value as is done in step 56, the selected correction factor corresponding to cylinder $n_i$ may be updated by carrying over the previous value for the correction factor.

In the preferred embodiment just described, a sliding window (i.e., circular buffer) is used to maintain a history of N raw accelerations and N corrected accelerations. This allows for a substantially equal amount of processing to be performed per cylinder event. In an alternative embodiment, the adaptive processing to determine corrected accelerations and updated correction factors can be performed in block fashion, i.e., by processing a block of N (or 2N) raw accelerations once per engine cycle.

The preferred embodiment will be described in more detail in view of the following formulas for implementing the steps of FIG. 6. Acceleration ACCEL between consecutive PIP periods i and i+1 can be expressed:

$$ACCEL(n_i) = \Delta\theta \frac{(\Delta T_i - \Delta T_{i+1})}{(\Delta T_i \Delta T_{i+1})\left(\frac{\Delta T_i + \Delta T_{i+1}}{2}\right)}$$

To simplify and speed-up processing, it may be more convenient to approximate the acceleration by substituting $\Delta T_i$ for $\Delta T_{i+1}$ in the average term $(\Delta T_i + \Delta T_{i+1})/2$, so that $$ACCEL(n_i) = \Delta\theta \frac{(\Delta T_i - \Delta T_{i+1})}{(\Delta T_i^2 \Delta T_{i+1})}$$

where $ACCEL(n_i)$ is the most recently determined raw acceleration value corresponding to cylinder firing sequence $n_i$. From $ACCEL(n_i)$, a corrected acceleration value $C\_ACCEL(n_i)$ corresponding to cylinder firing sequence number $n_i$ is determined as follows:

$$C\_ACCEL(n_i) = ACCEL(n_i) - COR(n_i)$$

where $COR(n_i)$ is the current value of the adaptive correction factor for cylinder $n_i$ at time index i. The adaptive correction factors are updated in the preferred embodiment as follows:

$$COR(n_i)_{new} = w\, E\_ACCEL + (1-w)COR(n_i)_{old}$$

where w is a weighting coefficient and $E\_ACCEL$ is an effective value for the raw acceleration of cylinder $n_i$. In this way, the correction factor is updated as an exponentially weighted moving average of raw acceleration values corresponding to a particular engine cylinder. Under steady state operating conditions of the engine (i.e. constant velocity, no acceleration) and with an irregularity-free crankshaft signal, this moving average of raw acceleration values would approximately equal zero. Thus, any non-zero average value corresponds to a repetitive pattern caused by wheel profile errors or torsional vibrations. These values are captured in the adaptive correction factors and are thus subtracted from the raw accelerations to yield a corrected acceleration value. Contributions to the average acceleration value from engine operation at other than steady state conditions do not provide a significant contribution to the exponentially weighted moving average since they typically occur over only short periods of time and because weighting coefficient w is selected to be small, which implies a long filter time constant.

As noted previously, the adaptation shown above may be subject to learning of misfire or gradual power loss conditions as normal by adjusting the correction factor based on the corresponding power-reduced acceleration values. Therefore, a substitute update is performed for the lowest relative acceleration value since that acceleration value would be most likely to correspond to either a misfire or a gradual power loss. For that cylinder firing which has the lowest relative acceleration, the particular adaptive correction factor is updated in a manner without regard to the raw acceleration value corresponding to that cylinder firing (and thus the particular corrected acceleration value which is relatively lowest). In the preferred embodiment, the measured raw acceleration value is replaced with an estimated raw acceleration value obtained from the other measured raw acceleration values in the same engine cycle. Since at steady state, the sum of raw acceleration values equals 0 if there are no misfires, the raw acceleration value that would have occurred without misfire or gradual power loss can be approximated as a negative sum of all raw acceleration values in a cycle other than the raw acceleration value being corrected. More specifically, the updating of a correction factor is based upon the effective raw acceleration as given by the following:

$$\text{If } C\_ACCEL(n_i) < C\_ACCEL(n_k) \text{ for all } k = 1 \text{ to } N, k \neq i, \text{ then}$$
$$E\_ACCEL = ACCEL(n_i) - SUM\_ACCEL$$
$$\text{where } SUM\_ACCEL = ACCEL(n_1) + ACCEL(n_2) + \ldots + ACCEL(n_N),$$
$$\text{otherwise}$$
$$E\_ACCEL = ACCEL(n_i).$$

Under steady conditions with no misfire, the two ways of obtaining E_ACCEL yield very closely the same value because the sum of raw acceleration values will be nearly zero. Thus, the corrected acceleration values and the manner for updating correction factors provides compensation for both wheel profile errors and torsional vibrations without being subject to corruption of the correction factor with large negative accelerations that might result from misfire.

Under conditions of sustained same cylinder misfire in one or more cylinders, the adapted correction factors may eventually evolve (even though delayed by the exponentially weighted moving average) so as to reduce the ability to detect such misfire (i.e., the correction may learn to regard misfire as normal in that particular condition). Therefore, an optional additional step 61 is shown in FIG. 6 that detects such sustained same cylinder misfire and adjusts the update rate (w) of the correction factors.

Figure 7:
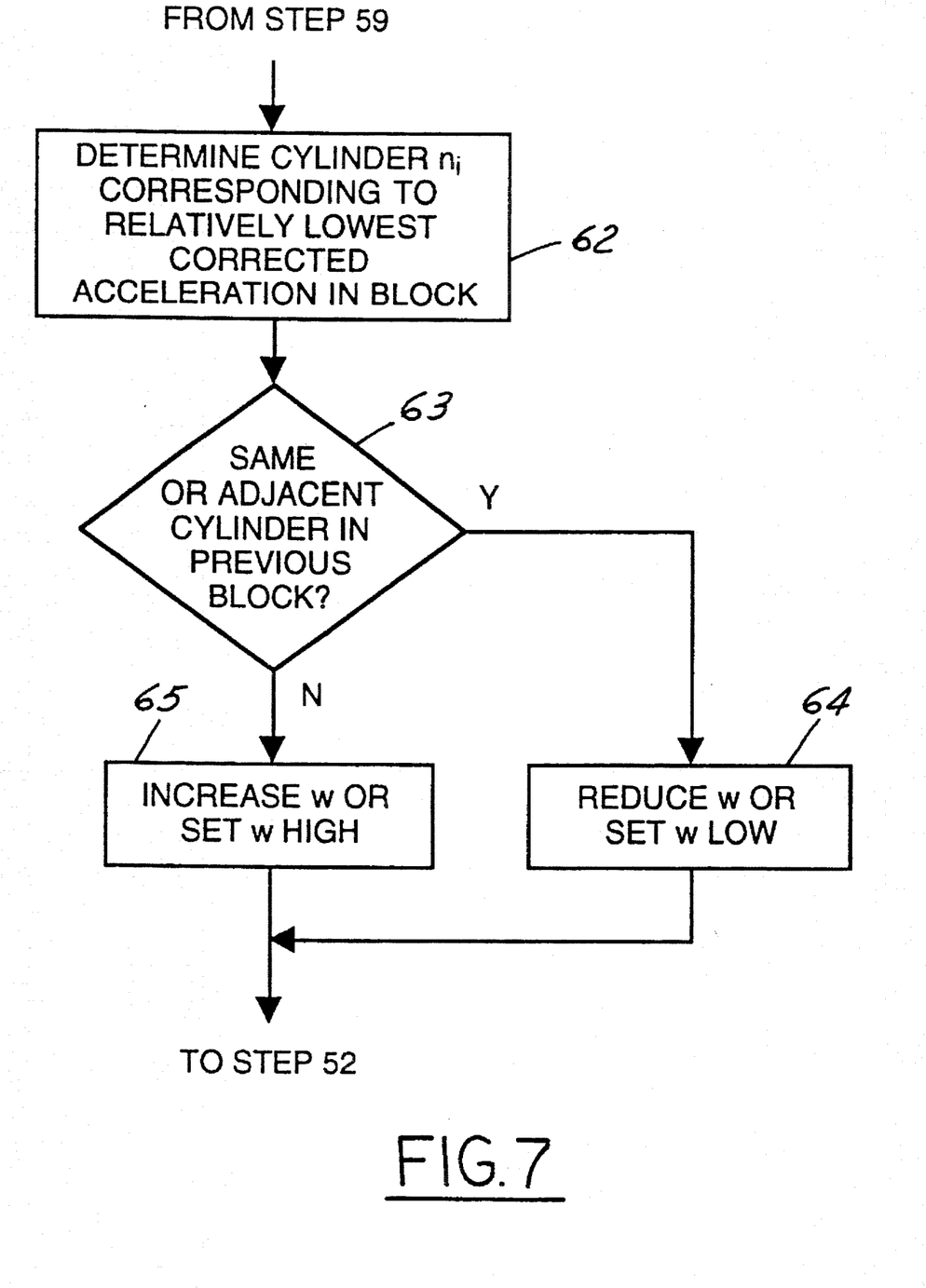
FIG. 7 is a flowchart showing a method for adjusting a time constant of an exponentially weighted moving average as utilized in the present invention.

The process of step 61 is shown in greater detail in FIG. 7. In step 62, the corrected acceleration value C_ACCEL($n_i$) in the current block $n_1$ to $n_N$ having the relatively lowest acceleration is identified. The relatively lowest corrected acceleration value corresponds to the particular cylinder most likely to have misfired in the block. In step 63, a comparison is made to determine whether the same cylinder $n_i$ also had the relatively lowest corrected acceleration value in the previous block. If it did, then the weighting coefficient w is reduced in step 64 by a predetermined amount or alternatively set to a low value. If not, then weighting coefficient w is increased in step 65 or alternatively set to a high value. Weighting coefficient w may for example have a normal or high value of 0.025 and a low or reduced value of 0.0025. Using intermediate values between the two extremes is optional. A return is made to step 52 and the possibly updated weighting coefficient is used in forming subsequent exponentially weighted moving averages to update the adaptive correction factors during the next block.

For greater robustness to the effects of measurement errors, step 63 may also check whether adjacent cylinders in the firing order of the engine had the relatively lowest acceleration value in consecutive blocks. This is because the pull-down effect of a misfiring cylinder may cause adjacent accelerations to decrease. Thus, it is possible that noise would partially obscure a pattern of loss of power in a particular cylinder by spreading the power loss to adjacent cylinders and the check in step 63 for adjacent cylinders would obtain a reduced weighting coefficient under those conditions. A reduced weighting coefficient slows the adaptation process such that an excessive misfire rate can be indicated prior to the time that the adaptive correction would learn misfire as a normal condition or permit misfires to be missed by the detector.

Other alternative steps can also be taken to avoid any adaptation to misfire or gradual power loss. For example, with the provision of additional computation and storage capacity in the micro-controller, two misfire detectors could be operated concurrently. One detector is selected as a primary misfire detector for making misfire calls. When misfire below a specified rate has been detected for a specified time by the primary detector, the secondary detector is initialized with correction factors equal to appropriate values (e.g., zero). After a short period of adaptation (e.g., 2/w cycles), the roles of primary and secondary detectors are reversed. If sustained same cylinder misfire exists at the time of reversal, the fact that the new primary detector had not been exposed to the same onset of gradual power loss allows that detector to detect misfire that would have been missed by the other detector. Alternatively, a single detector could be used with periodic reinitialization of the correction factor if it is satisfactory to disable misfire detection for the initial adaptation period (e.g., 2/w cycles).

Figure 8:
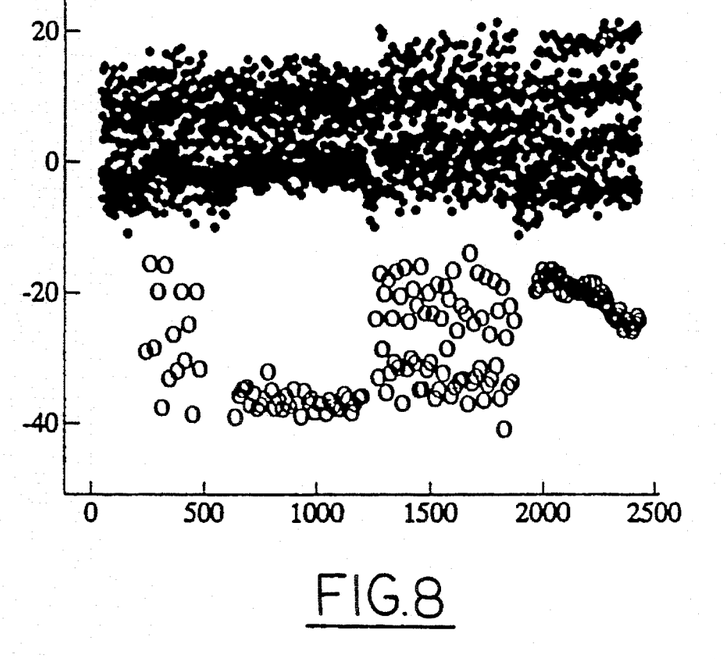
FIG. 8 plots measured acceleration data for misfiring and properly firing cylinder events as determined from uncorrected raw acceleration values.
Figure 9:
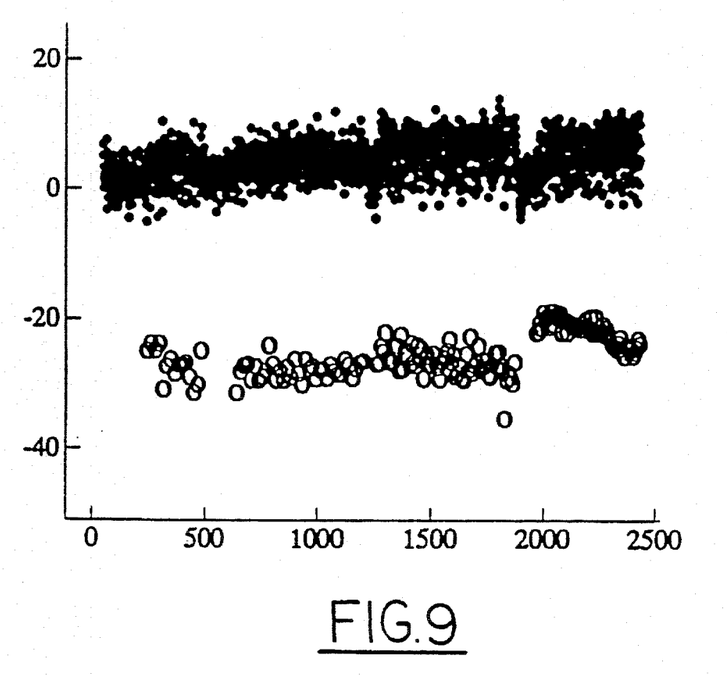
FIG. 9 plots corrected acceleration values corresponding to FIG. 8.

Significant improvements are achieved using the present invention as shown in FIGS. 8 and 9. FIG. 8 plots raw acceleration values for cylinder events i. Dots correspond to proper firings and circles correspond to known misfires (i.e., misfires introduced intentionally). The corrected acceleration values are shown in FIG. 9 with a clear improvement in the separation between misfires and proper firings.

What is claimed is:

1. A method of obtaining adaptive correction factors to detect malfunctions in an internal combustion engine, said method comprising the steps of:

measuring an engine variable at a plurality of different times to produce raw values of said engine variable;

correcting said raw values by applying a respective adaptive correction factor to each raw value to produce corrected values;

selecting one of said adaptive correction factors for updating;

selecting a block of consecutive corrected values including a particular corrected value that has been corrected using said one selected adaptive correction factor;

comparing said particular corrected value with other said corrected values of said block; and if said particular corrected value is more closely indicative of said malfunction than each of said other corrected values of said block, then updating said particular adaptive correction factor in a first manner without regard to the raw value corresponding to said particular corrected value, otherwise, if said particular corrected value is not more closely indicative of said malfunction than each of said other corrected values of said block, then updating said particular adaptive correction factor in a second manner responsive to said raw value corresponding to said particular corrected value.

2. A method of obtaining adaptive correction factors to determine crankshaft acceleration in a misfire detector for an internal combustion engine with N cylinders, said method comprising the steps of:

measuring a plurality of raw acceleration values each corresponding to a respective engine rotation interval, each engine rotation interval corresponding to a power stroke of a respective engine cylinder;

correcting said raw acceleration values to produce corrected acceleration values in response to a plurality of respective adaptive correction factors, each adaptive correction factor corresponding to a respective engine cylinder;

selecting one of said adaptive correction factors, corresponding to a particular engine cylinder, for updating;

selecting a block of N consecutive corrected acceleration values including a particular corrected acceleration value corresponding to said particular engine cylinder;

comparing said particular corrected acceleration value with the other said corrected acceleration values of said block; and if said particular corrected acceleration value is less than each of said other corrected acceleration values of said block, then updating said particular adaptive correction factor in a first manner without regard to the raw acceleration value corresponding to said particular corrected acceleration value, otherwise, if said particular corrected acceleration value is not less than each of said other corrected acceleration values of said block, then updating said particular adaptive correction factor in a second manner responsive to said raw acceleration value corresponding to said particular corrected acceleration value.

3. The method of claim 2 wherein said second manner of updating of said particular adaptive correction factor is comprised of an exponentially weighted moving average including said raw acceleration value corresponding to said particular corrected acceleration value and previous raw acceleration values corresponding to said particular engine cylinder, said exponentially weighted moving average having a weighting coefficient w.

4. The method of claim 3 further comprising the steps of:

selecting a plurality of blocks of N consecutive corrected acceleration values;

identifying the one of said corrected acceleration values in each respective block having a relatively lowest acceleration of said block, said relatively lowest corrected acceleration value corresponding to a particular cylinder most likely to have misfired during each respective block; and reducing said weighting coefficient w in the event that the particular cylinder most likely to have misfired is the same in consecutive blocks.

5. The method of claim 3 further comprising the steps of:

selecting a plurality of blocks of N consecutive corrected acceleration values;

identifying the one of said corrected acceleration values in each respective block having a relatively lowest acceleration of said block, said relatively lowest corrected acceleration value corresponding to a particular cylinder most likely to have misfired during each respective block; and reducing said weighting coefficient w in the event that 1) the particular cylinder most likely to have misfired is the same in consecutive blocks, or 2) the particular cylinders most likely to have misfired in consecutive blocks are adjacent in a firing order of said engine.

6. The method of claim 2 wherein said first manner of updating of said particular adaptive correction factor includes an approximated raw acceleration value for said particular engine cylinder not based on said raw acceleration value corresponding to said particular corrected acceleration value.

7. The method of claim 6 wherein said approximation is responsive to a negative sum of all raw acceleration values in said block except said raw acceleration value corresponding to said particular corrected acceleration value.

8. Apparatus for detecting misfires during individual cylinder firings in an internal combustion engine having N cylinders, comprising:

timing means for measuring crankshaft rotation intervals corresponding to respective power strokes of said N cylinders;

raw acceleration means coupled to said timing means for determining raw acceleration values corresponding to respective power strokes in response to said crankshaft rotation intervals;

correction means coupled to said raw acceleration means for correcting said raw acceleration values to produce corrected acceleration values in response to a plurality of respective adaptive correction factors, each adaptive correction factor corresponding to a respective engine cylinder; and updating means coupled to said correction means for 1) selecting one of said adaptive correction factors, corresponding to a particular engine cylinder, for updating, 2) selecting a block of N consecutive corrected acceleration values including a particular corrected acceleration value corresponding to said particular engine cylinder, 3) comparing said particular corrected acceleration value with the other said corrected acceleration values of said block, 4) updating said particular adaptive correction factor in a first manner without regard to the raw acceleration value corresponding to said particular corrected acceleration value if said particular corrected acceleration value is less than each of said other corrected acceleration values of said block, and 5) updating said particular adaptive correction factor in a second manner responsive to said raw acceleration value corresponding to said particular corrected acceleration value if said particular corrected acceleration value is not less than each of said other corrected acceleration values of said block.

9. The apparatus of claim 8 wherein said updating means is comprised of an exponentially weighted moving average for determining said particular adaptive correction factor as an exponentially weighted moving average of a plurality of raw acceleration values corresponding to said particular cylinder when said particular corrected acceleration value is not less than each of said other corrected acceleration values of said block.

10. The apparatus of claim 9 wherein said exponentially weighted moving average has a weighting coefficient w, and wherein said updating means is further comprised of comparison means for identifying cylinders having a relatively lowest corrected acceleration value in a plurality of consecutive blocks of N corrected acceleration values, said updating means reducing said weighting coefficient w in the event that 1) said identified cylinders with the relatively lowest corrected acceleration values are the same in consecutive blocks, or 2) said identified cylinders with the relatively lowest corrected acceleration values are adjacent in the firing order of said engine.

11. The apparatus of claim 8 wherein said updating means is comprised of a summer for determining said particular adaptive correction factor in response to a negative sum of all raw acceleration values in said block except said raw acceleration value corresponding to said particular corrected acceleration value when said particular corrected acceleration value is less than each of said other corrected acceleration values of said block.

* * * * *